United States Patent
Kitz

[19]

[11] Patent Number: 5,940,973
[45] Date of Patent: Aug. 24, 1999

[54] TRIMMER GUIDE

[75] Inventor: Robert Earl Kitz, Rock Hill, S.C.

[73] Assignee: Deere & Company, Moline, Ill.

[21] Appl. No.: 09/063,426

[22] Filed: Apr. 21, 1998

[51] Int. Cl.[6] .......................... A01D 34/47; A01D 34/84
[52] U.S. Cl. .................. 30/276; 20/296.1; 20/275.4; 56/12.7
[58] Field of Search .................. 30/275.4, 276, 30/296.1; 56/12.1, 12.7

[56] References Cited

U.S. PATENT DOCUMENTS

| | | | |
|---|---|---|---|
| 4,364,435 | 12/1982 | Tuggle et al. | 30/296.1 X |
| 4,442,659 | 4/1984 | Enbusk | 56/12.7 |
| 4,658,506 | 4/1987 | Nilsson | 30/371 |
| 4,756,084 | 7/1988 | Morita | 30/276 |
| 4,803,831 | 2/1989 | Carmine | 56/16.9 |
| 4,894,916 | 1/1990 | Nimz et al. | 30/298.4 |
| 4,914,899 | 4/1990 | Carmine | 56/16.7 |
| 4,981,012 | 1/1991 | Claborn | 56/16.9 |
| 5,048,187 | 9/1991 | Ryan | 30/276 |
| 5,095,687 | 3/1992 | Andrew et al. | 30/296.1 X |
| 5,107,665 | 4/1992 | Wright | 56/12.7 |
| 5,228,276 | 7/1993 | Miller | 30/275.4 X |
| 5,317,807 | 6/1994 | Pulley | 30/296.1 |
| 5,351,762 | 10/1994 | Bean | 56/12.7 X |
| 5,383,330 | 1/1995 | Yokocho et al. | 56/256 |
| 5,423,126 | 6/1995 | Byrne | 30/276 |

*Primary Examiner*—Rinaldi I. Rada
*Assistant Examiner*—T. Anthony Vaughn

[57] ABSTRACT

A guide is provided for a string trimmer that permits it to be positioned closely adjacent to or in a variety of positions further from borders and similar objects. The guide is attachable to the guard of the trimmer and is composed of two slideably adjustable members that permit its length to be varied to provide different spacings from borders and objects. The guide includes an obtuse angle formed in its length to permit it to be used vertically as an edger and vary the spacings from borders when it is used as a horizontal trimmer. An elliptical head is provided on the outer end of the plastic guide to facilitate fine spacing adjustments and enable sliding movement along a variety of surfaces such as pavements, stones and gravel.

9 Claims, 3 Drawing Sheets

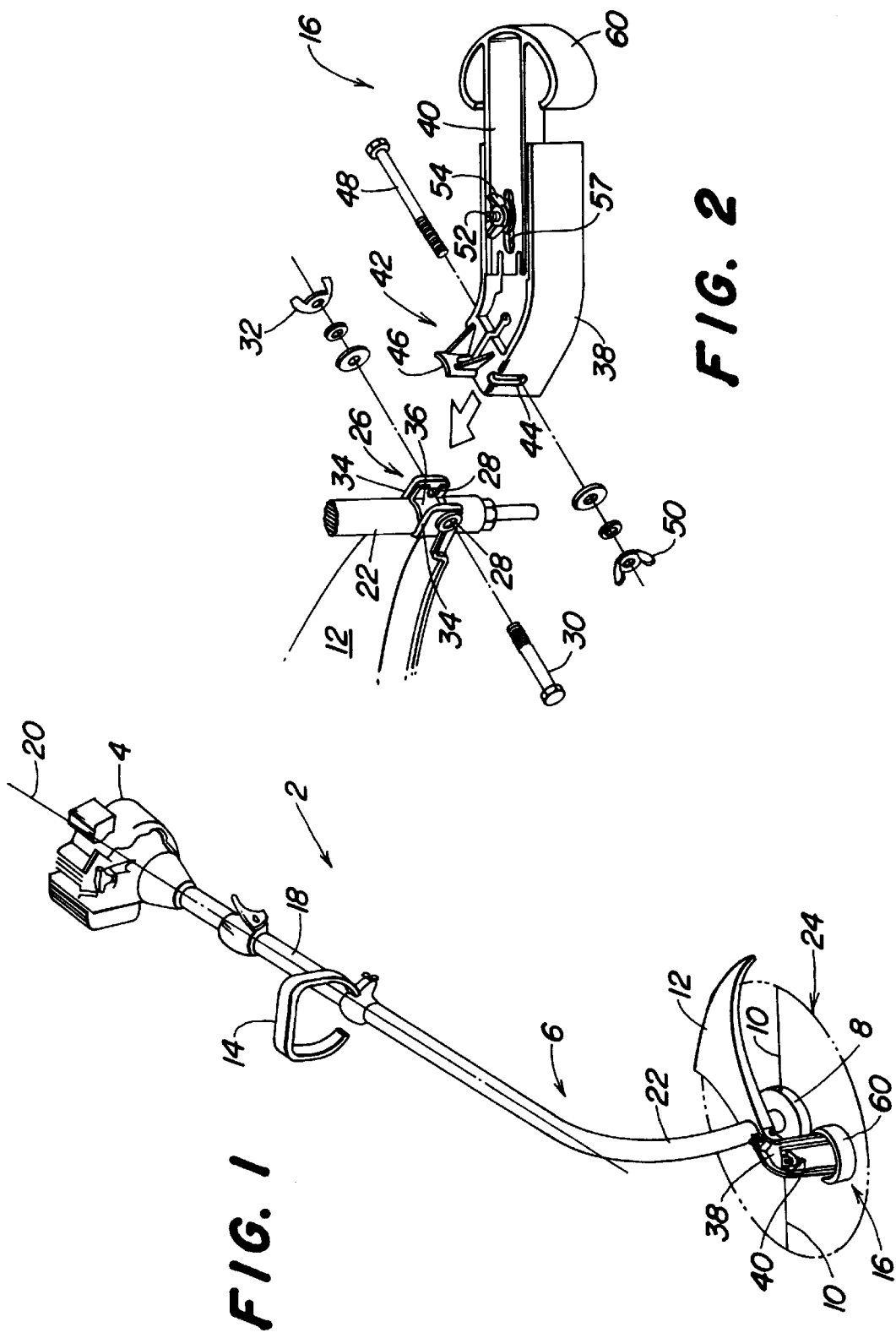

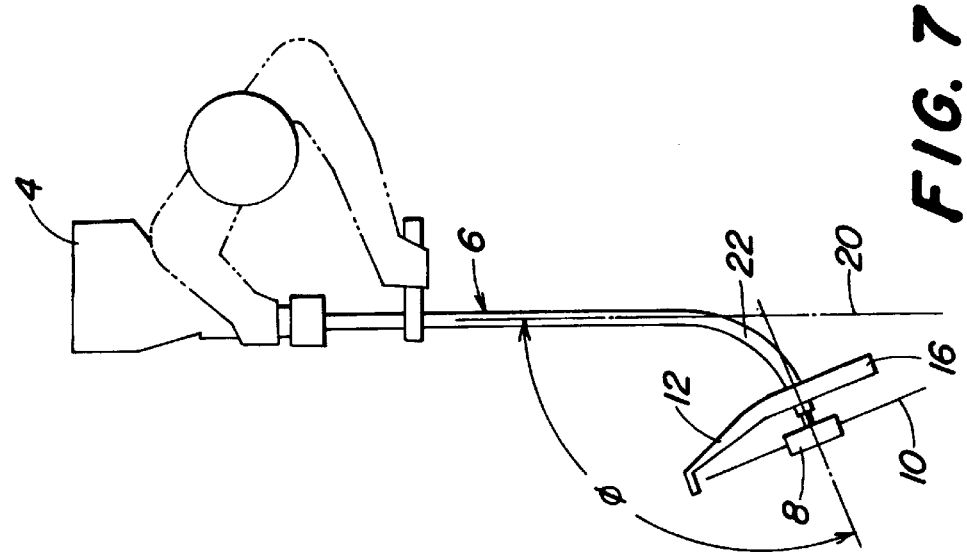
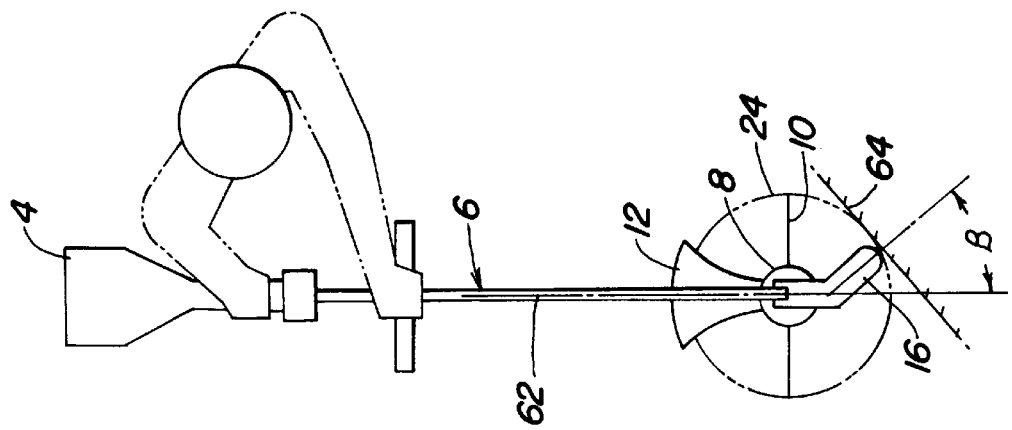
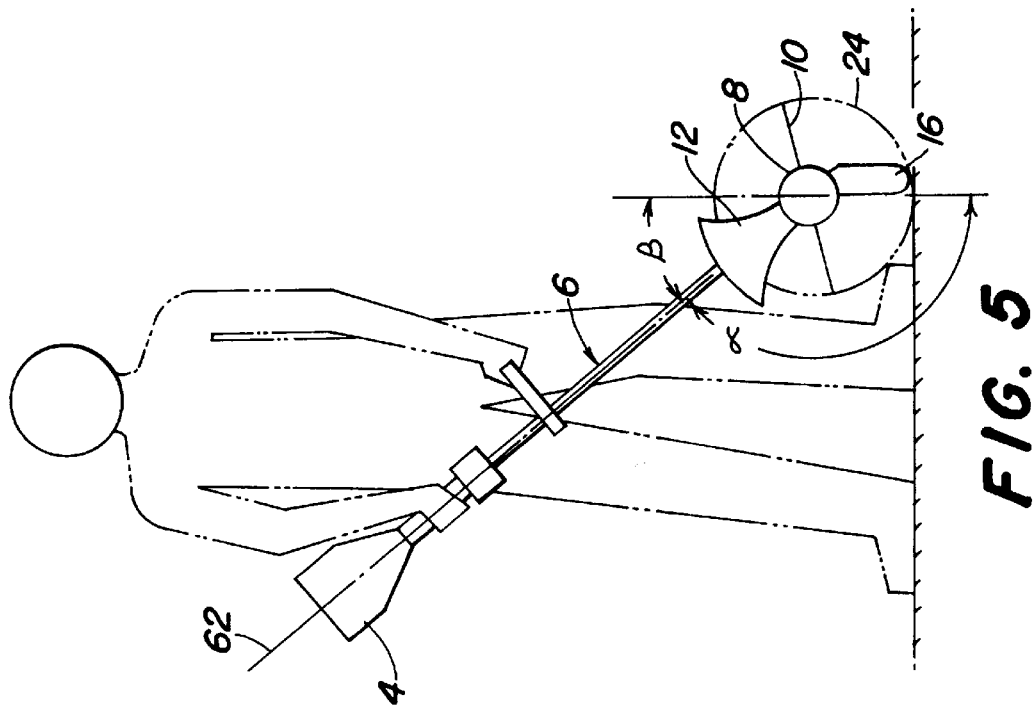

TRIMMER GUIDE

FIELD OF THE INVENTION

The present invention relates to string trimmers and more particularly to a guide which can be attached to a trimmer when it is to be used to edge or trim adjacent walls, fences or similar objects.

BACKGROUND OF THE INVENTION

String trimmers provide a versatile tool used in commercial and residential yard maintenance activities. These trimmers are particularly useful in trimming grass or edging along sidewalks, pavements, fences and similar borders.

When used to cut an edge, the cutting plane of the trimmer is rotated 90 degrees so that the cutting element rotates vertically. Since the cutting element rotates at a high speed, the guard which is positioned above and parallel to the cutting plane, is also oriented vertically. In this position, soil and vegetation cut by the string can be thrown outwardly and upwardly in a path extending radially from the cutting head.

To space the vertical cutting plane of the trimmer away from the operator in such situations, and thereby minimize the likelihood that they will be hit by flying debris, many trimmers have been provided with a curved support tube, so that when they are rotated 90 degrees, the cutting plane is spaced sideways from the operator.

To control the depth of the edge being cut, space the cutting element away from the operator and control the volume of the debris being thrown, trimmers have been provided with guides placed near the cutting head that roll or slide on the surface adjacent the edge being cut.

These guides also serve, when the trimmer is used to cut horizontally, to space it and its cutting element a given distance from walls, fences or similar objects. With this control over the spacing of the cutting plane from a given object, it is easier to achieve an even cut, prevent contact of the cutting element with the object and reduce cutting element wear.

Trimmer guides have often taken the form of rollers attached to the trimmer tube. These rollers include axles, bearings and miscellaneous support structures as well as members for attaching them to the trimmer. Being comprised of several parts, they can be costly to manufacture and assemble, incur rapid wear, require frequent maintenance and encounter failures as they are exposed to dirt, debris, water and similar contaminants.

SUMMARY OF THE INVENTION

It would therefore be desirable to provide a string trimmer usable for edging and trimming along lawns, sidewalks, pavements, walls and similar borders.

It would also be desirable to provide a trimmer with a curve in the support tube that offsets the cutting head from the main support tube when the cutting plane is oriented vertically so that debris thrown during edging procedures are spaced from and directed away from the operator.

Further, it would be desirable to provide the trimmer with a guide adjacent to the cutting head that would allow the operator to control the depth of the edge being cut as well as the spacing of the cut from the border, wall or fence. It would also be desirable to provide for the guide to reliably operate on a variety of surfaces including pavements, stones and gravel.

Additionally, it would be desirable to provide for the guide to be adjustable so that the trim depth and spacing could be changed to meet differing conditions, changes in the diameter of the cutting element and compensate for wear of the cutting element. It further would be desirable to provide for quick and easy adjustment of the depth of cut or spacing without the need for any tools or special parts.

Also it would be desirable to provide a guide without axles, bearings and similar parts to minimize maintenance and the need to repair or replace them due to contamination from dirt, dust, water and so forth. And it would be desirable to provide a guide with a minimum number of parts so that it could be economically manufactured, assembled and operated.

Towards these ends, there is provided a string trimmer with a curved support tube that offsets the cutting head so that the vertical cutting plane of the string trimmer is spaced from the operator when it is used for edging operations. The guide is removably attached to the guard to utilize the same fastener structure used to secure the guard with the tube. The guide extends approximately 50 degrees from a plane cutting through the tube to provide for the guide to be oriented vertically when the cutting plane of the string cutting head is positioned vertically for edging. The guide is composed of two adjustable plastic members with a plurality of settings to easily set the desired depth of cut for differing conditions, to compensate for string wear, or to accommodate various cutting diameters. The two members are joined together at an obtuse angle and provided with an elliptical head to permit spacing of the trimmer head from an object to be varied. A detent is provided on one member, with the other member having a plurality of openings to accurately adjust the depth of spacing of the guide. Attachment of the guide to the guard as well as attachment of the two guide members together is accomplished without tools, through the use of bolts and wingnuts. The guide is preferably a plastic or composite material to provide for ease of manufacture and durable operation. Further the guide surface utilizes an elliptical head that can easily follow along varying surfaces or ground conditions.

BRIEF DESCRIPTION OF THE DRAWINGS

FIG. 1 is an elevated front perspective view of a string trimmer utilizing the present invention.

FIG. 2 is an enlarged and exploded view of the attaching structure between the guide and the guard of the trimmer.

FIG. 5 is a schematic front view illustrating an operator utilizing the edger with the present guide.

FIG. 6 is a schematic plan view of an operator utilizing the edger with the cutting plane oriented horizontally.

FIG. 7 is a plan view of an operator utilizing the edger with the cutting plane oriented vertically.

DESCRIPTION OF THE PREFERRED EMBODIMENT

Figure 3:
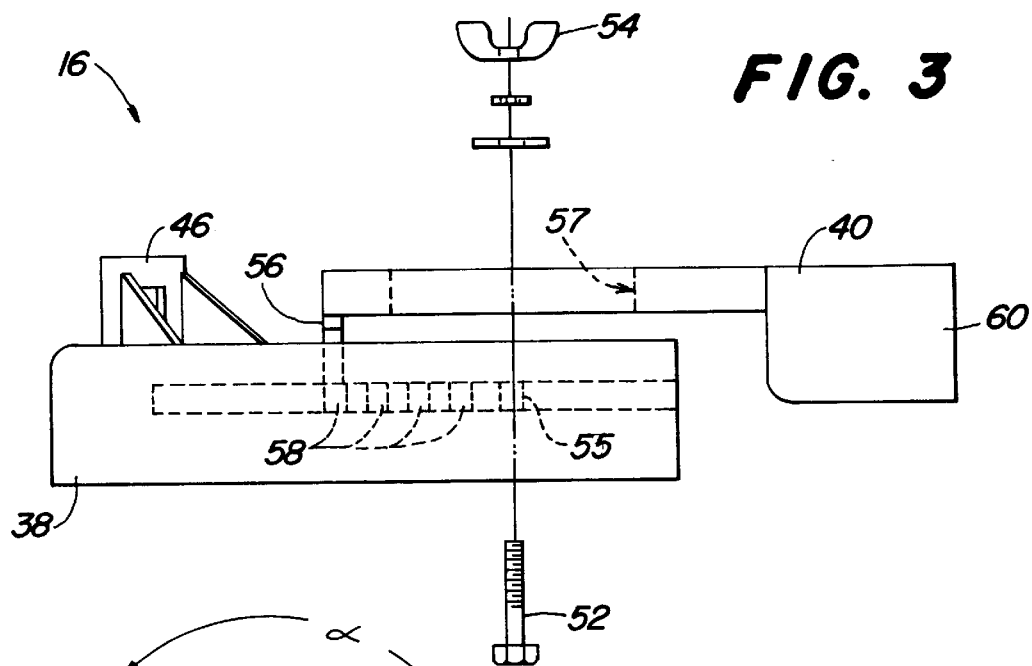
FIG. 3 is a schematic side view of the two-part guide illustrating the detent and fastening structure.

Looking first to FIG. 1, there is illustrated a string trimmer 2 including a power means 4, a tube 6 connected with the power means, a cutting head 8 carried at the opposite end of the tube 6, connected with the power means 4 and supporting a flexible cutting line or element 10, a guard 12 supported on the tube 6 above the cutting head 8, a handle 14 for carrying and manipulating the string trimmer 2, and a guide 16 attached to the guard 12.

The power means 4, which typically is a small gasoline engine or electric motor is supported on a first tube portion 18, which extends along a straight line 20. A second tube portion 22 angles downwardly from the first portion 18. The cutting head 8 is designed to rotate the string cutting element 10 in a plane 24 which would be generally horizontal when trimming grass. The guard 12 extends backwardly from the cutting head 8 and towards the operator to provide a shield for deflecting debris thrown by the rotating string element 10. The guard 12 is removably mounted and secured to the tube portion 22, as best illustrated in FIG. 2, by a first clamping means 26 adapted to fit around the tube. The first clamping means 26 includes first openings 28 sized to receive a bolt or fastener 30, and a wingnut 32 is provided to tighten the two ears 34 of the first clamping means 26 and the guard 12 with the tube 22. Between the ears 34 is placed a C-shaped spacer 36 that abuts the two ears 28 and the second tube portion 22.

Figure 4:
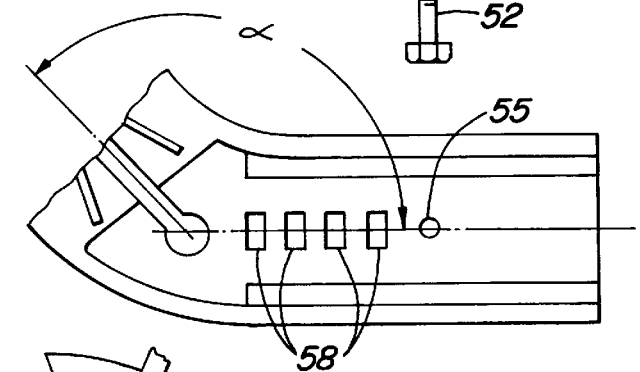
FIG. 4 is a partial plan view of one member of the guide illustrating the plurality of openings for receiving the detent.

As best illustrated in FIGS. 2, 3 and 4, the guide structure 16 is composed of first and second members 38 and 40. The first member 38 includes an obtuse angle α formed in its length. At its one end, the first member 38 is adapted to be secured to the guard 12 and thereby attached to and supported by the tube 22. The first member 38 is provided with a second clamping means 42 including openings 44 and an abutment surface 46 for engaging the tube 22. To secure the guard 12 and guide 16 together, the bolt 30 fastening the guard 12 to the tube 22 would first be removed. Then the end of the first member 38 would be placed over the two ears 34 of the first clamping means 26 to align the openings 44 of the second clamping means 42 with the openings 28 of the first clamping means 26. As the openings 28 and 44 are aligned, the abutment surface 46 would engage the second tube portion 22. Then the longer bolt 48, as illustrated in FIG. 2, would be inserted through the openings 44 and 28 in the guide 16 and guard 12 to secure them together and to the tube 22. A similar wingnut 50 can then be used with bolt 48 to secure the guide 16 and guard 12 to the tube 22.

The first and second guide members 38 and 40 can be slideably adjusted between a plurality of positions. As is best shown in FIGS. 3 and 4, the members 38 and 40 can be slideably adjusted through loosening the wingnut 54 threaded on bolt 52, which in turn is seated in the opening 55 of member 38 and the slot 57 of member 40, See FIG. 3. The slot 57 provided in member 40 permits it to be shifted relative to member 38. Once loosened, the second member 40 is tilted to disengage the detent tab 56 from the opening 58 to slideably move it along the first member 38. The detent 56 is then seated in a different stop or opening 58 of the first member 38 to adjust the overall length of the guide 16. The bolt 52 and wingnut 54 are then tightened to secure the parts 38 and 40 in the selected positions.

The second guide member 40 is provided with an elliptical head 60 on one end, as is best illustrated in FIGS. 1 and 2. The elliptical shape allows the head 60 to slideably move along a variety of surfaces such as sidewalks, cobblestones, gravel, wells, fences and so forth. In the preferred embodiment, the guide 16 is composed of plastic to facilitate easier and more economical manufacture, assembly and maintenance.

Schematically illustrating the trimmer 2 in use are FIGS. 5, 6 and 7. FIG. 5 illustrates a front view of the trimmer 2 being used to cut an edge. In this usage, the cutting plane 24 is oriented vertically. When utilized in this manner, the tube 2 is held at an angle β from vertical, which is expected to approximate 50 degrees in typical usage. When held at this angle β, the second member 40 of the guide 16 would generally be perpendicular to the ground. To provide for the second member 40 to be perpendicular to the ground when the trimmer 2 is used in cutting an edge, the obtuse angle α in the first member 38 is approximately 130 degrees, the reciprocal of angle β, (50 degrees), see FIG. 5.

Looking now to FIG. 6, there is shown a schematic plan view of an operator utilizing the trimmer 2 with the cutting element 10 rotating in a horizontal plane, the orientation commonly used to trim grass. Also shown schematically is a wall or border from which the guide 16 serves to space the trimmer. Since this view is simply a reverse view of that illustrated in FIG. 5, the angle β at which the guide 16 extends from a plane 62 passing through the tube 22 would also be 50 degrees. Here also, the guide 16 would be generally perpendicular to the wall or border 64.

Looking now to FIG. 7, there is illustrated a plan view of the trimmer 2 being used with the cutting element 10 in the vertical orientation shown in FIG. 5. In this view, it is apparent that the tube 6 includes an angled end or second portion 22, with that angle φ being approximating 113 degrees from the line 20 passing through the first tube portion 18. With the second portion 22 angled, the cutting head 8 will be spaced away from the operator. Since the curve in the tube 6 is to the left, as seen in FIG. 7, the cutting plane will be at an angle to the operator so that debris thrown by the string cutting element 10 as it edges the lawn are directed in a radially outwardly path away from the operator. The leftward angle α in the guide, see FIG. 4, further encourages the operator when using the trimmer vertically, to turn the trimmer 2 counterclockwise, as viewed by the operator, and cut on his right as shown in FIG. 7, so that debris are thrown away from him.

Figure 8:
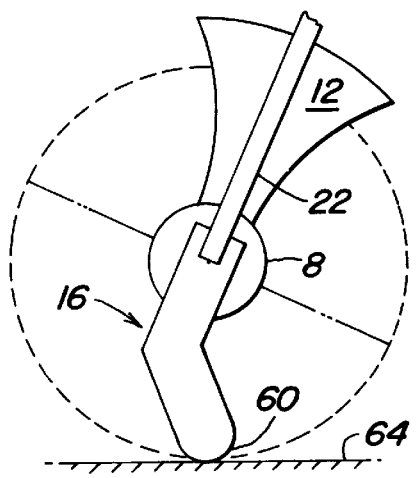
FIG. 8 is a schematic view of the guide being used at a distance from a border.
Figure 9:
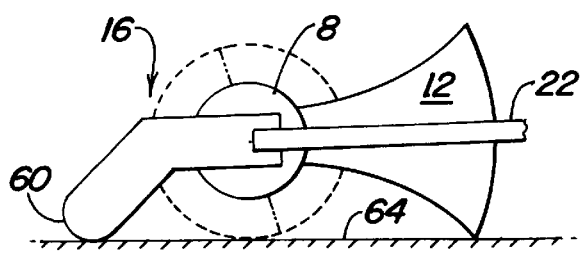
FIG. 9 is a schematic view of the guide being used closely adjacent to a border.

Looking now to FIGS. 8 and 9, there is illustrated the use of the guide 16 closely adjacent to and spaced further from a wall or border 64. As shown in FIG. 4, the first member 38 of guide 16 is provided with an obtuse angle α of approximately 130 degrees relative to the plane 62 through the tube portions 18 and 22. It is also this angle α that permits the guide 16 to be used in the closely spaced side position illustrated in FIG. 9, the further spaced away position shown on FIG. 8 or at any spacing in between. Since the head of the guide 16 is elliptical, the operator can "fine tune" the spacing adjustment from the border 64 as he chooses the portion of the head 60 that makes contact with the border 64.

With the present guide means, there is provided a composite guide structure which allows for the quick and easy orientation of the cutting plane when edging, and which permits cutting of an edge to the desired depth as well as space from the border along which the cut is being made. With the easily adjustable two part guide, the length of the guide can be adjusted to compensate for the differing conditions, desired depth of cut, or wear of the string element without the use of tools. With the guide being made of composite material, wear is minimized along the surface of the guide head. Through use of an elliptical head shape, the guide can easily slide along a variety of surfaces such as sidewalks, cobblestones, gravel, walls, fences and so forth. Further, through the use of wingnuts and bolts with the compatible attaching surfaces, the guide can be attached to the guard or moved therefrom without the need for special tools or special attaching structure.

We claim:

1. For use with a string trimmer having a power means, a tube connected with the power means, the tube having a first portion extending along a straight line and a second portion angled downwardly at an acute angle to said line and terminating at an end; a cutting head carried adjacent said end, said head supporting a flexible line adapted to be rotated within a cutting plane by the power means; an elongated guard having means removably mounting it on the second portion of the tube adjacent the cutting head; and a trimmer guide removably attached with the means mounting the guard on the tube, said guide including first and second members which are slideably adjustable to a plurality of positions with a detent provided in one member for being removably received in a plurality of stops provided in the other member.

2. The invention defined in claim 1 wherein the first member of the guide is removably attachable to the means mounting the guard.

3. The invention defined in claim 1 wherein the guide includes an outer end spaced from the tube which includes an elliptical surface.

4. The invention defined in claim 1 wherein the first and second members are joined together at an obtuse angle.

5. The invention defined in claim 3 wherein the guide is composed of plastic.

6. The invention defined in claim 1 wherein the means mounting the guard with the tube includes a first clamping structure adapted to abut the tube, said clamping structure having a first opening for removably receiving a fastener to secure the guard to the tube, and the guide includes a second clamping structure having a second opening alignable with the first opening to permit a fastener to be received through said openings to secure the guide to the guard.

7. The invention defined in claim 1 wherein a plane passing through the first and second portions of the tube would extend vertically when the cutting plane is oriented generally horizontally.

8. The invention defined in claim 7 wherein the guide extends approximately 50 degrees laterally of the plane through the tube portions.

9. The invention defined in claim 1 wherein an opening is provided through one member and a slot is provided in the other, said opening and slot providing an aperture that can removably receive a fastener to secure the two members in a plurality of respective positions.

\* \* \* \* \*